US008005786B2

(12) United States Patent
Li et al.

(10) Patent No.: US 8,005,786 B2
(45) Date of Patent: Aug. 23, 2011

(54) ROLE-BASED USER TRACKING IN SERVICE USAGE

(75) Inventors: Karvell Li, Bellevue, WA (US); Jamie Marconi, Seattle, WA (US); Rahul Kumar, Kirkland, WA (US); Miriam Borkenhagen, Bothell, WA (US); David Law, Seattle, WA (US); Gilbert McQuillan, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 11/903,138

(22) Filed: Sep. 20, 2007

(65) Prior Publication Data
US 2009/0083272 A1 Mar. 26, 2009

(51) Int. Cl.
*G06F 7/00* (2006.01)
(52) U.S. Cl. ...................................... 707/603
(58) Field of Classification Search ............ 707/603, 707/999.001
See application file for complete search history.

(56) References Cited

U.S. PATENT DOCUMENTS

| | | | | |
|---|---|---|---|---|
| 5,813,863 A * | 9/1998 | Sloane et al. | ............ | 434/236 |
| 6,411,961 B1 | 6/2002 | Chen | | |
| 6,470,383 B1 * | 10/2002 | Leshem et al. | ............ | 709/223 |
| 6,901,378 B1 | 5/2005 | Linker et al. | | |
| 7,003,560 B1 | 2/2006 | Mullen et al. | | |
| 7,020,696 B1 | 3/2006 | Perry et al. | | |
| 7,152,070 B1 | 12/2006 | Musick et al. | | |
| 7,620,162 B2 * | 11/2009 | Aaron et al. | ............ | 379/111 |
| 2002/0035622 A1 | 3/2002 | Barber | | |
| 2002/0111887 A1 * | 8/2002 | McFarlane et al. | ............ | 705/30 |
| 2003/0151621 A1 | 8/2003 | McEvilly et al. | | |
| 2003/0216936 A1 * | 11/2003 | Saitoh et al. | ............ | 705/1 |
| 2004/0148347 A1 * | 7/2004 | Appelman et al. | ............ | 709/204 |
| 2005/0132381 A1 * | 6/2005 | Fiammante et al. | ............ | 719/310 |
| 2005/0160167 A1 | 7/2005 | Cheng et al. | | |
| 2005/0165643 A1 | 7/2005 | Wilson et al. | | |
| 2005/0188080 A1 | 8/2005 | Motsinger et al. | | |
| 2005/0188220 A1 | 8/2005 | Nilsson et al. | | |
| 2005/0240580 A1 | 10/2005 | Zamir et al. | | |
| 2005/0256839 A1 | 11/2005 | Leong et al. | | |
| 2005/0262119 A1 | 11/2005 | Mawdsley | | |
| 2006/0031377 A1 | 2/2006 | Ng et al. | | |
| 2006/0069717 A1 | 3/2006 | Mamou et al. | | |
| 2006/0095507 A1 * | 5/2006 | Watson | ............ | 709/203 |

(Continued)

FOREIGN PATENT DOCUMENTS
WO 0221263 A1 3/2002

(Continued)

OTHER PUBLICATIONS

Application as Filed for U.S. Appl. No. 11/901,990, filed Sep. 20, 2007.

(Continued)

*Primary Examiner* — Kimberly Lovel
*Assistant Examiner* — Mohammed R Uddin

(57) ABSTRACT

Devising a centralized usage database for tracking and recording the usage of various services by various users may be difficult for several reasons, including the volume of data generated by each user in interacting with each service. Techniques are disclosed for streamlining usage data transmitted between the services, the users, and the usage database, such as by redistributing a portion of the computational burden to the users, and by characterizing the usage data based on the role of each user in interacting with each service. Additional techniques are disclosed for caching and authenticating the usage data, and for improving the response rate in the interaction of the usage database with users in order to provide a better user experience.

19 Claims, 12 Drawing Sheets

U.S. PATENT DOCUMENTS

| | | | |
|---|---|---|---|
| 2006/0235935 A1 | 10/2006 | Ng | |
| 2006/0282778 A1 | 12/2006 | Barsness et al. | |
| 2008/0147684 A1* | 6/2008 | Sadovsky et al. | 707/100 |
| 2008/0228910 A1* | 9/2008 | Petri | 709/224 |
| 2008/0288629 A1* | 11/2008 | Fisher et al. | 709/224 |
| 2009/0164622 A1* | 6/2009 | Braam et al. | 709/224 |
| 2009/0182873 A1* | 7/2009 | Spalink et al. | 709/224 |
| 2010/0063884 A1* | 3/2010 | Aaron et al. | 705/14.66 |
| 2010/0114941 A1* | 5/2010 | Von Kaenel et al. | 707/769 |

FOREIGN PATENT DOCUMENTS

WO    WO 03094000 A2 * 11/2003

OTHER PUBLICATIONS

Carey, et al. "Keep Your Data Flowing: Accessing Multiple Data Sources Made Easy", Date: Jan. 29, 2004, http://dev2dev.bea.com/pub/a/2004/01/carey_mangatani.html.

Chan, Joseph O., "Building Data Warehouses Using the Enterprise Modeling Framework", Date: 2004, vol. 13, No. 2.

Chan, Joseph O., "Toward a Unified View of Customer Relationship Management", Date: Mar. 2005, Schaumburg, IL, http://66.102.1.104/scholar?hl=en&lr=&q=cache:bOibFo20VC0J:professores.ea.ufrgs.br/hfreitas/disciplinas/sig_adp/slides/CRM_Chan_unified_view.pdf+aggregate+data+%2B+profile+schema+%2B+silos.

Kotinurmi Paavo, "User Profiles and Their Management", pp. 1-11.

Zhang et al., "Development of a self-adaptive Web search engine", Proceedings of the 3rd International Workshop on Web Site Evolution, Date: Nov. 10, 2001 pp. 86-93.

Non-Final Office Action cited in related U.S. Appl. No. 11/901,990 dated Feb. 4, 2010.

Final Office Action cited in related U.S. Appl. No. 11/901,990 dated Jul. 23, 2010.

"User Profiles and Their Management", Paavo Kotinurmi, 2001, 11 pgs., [online] htt://www.tml.tkk.fi/Studies/Tik-111.590/2001s/papers/paavo_kotinurmi.pdf.

* cited by examiner

ROLE-BASED USER TRACKING IN SERVICE USAGE

BACKGROUND

A great number and variety of services have become available to computer users, particularly with the growth of the internet. A user may utilize one service for email, another service for instant messaging, a third service for news, and a fourth service for weblogs. A provider of a plurality of various services may wish to record each user's interactions with each service, and to compile a user profile of a particular user based on his or her utilization of the wide variety of services. A record of such a service for a body of users might be helpful for analyzing usages of services or devising new services that may appeal to various groups of users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A usage database is presented for recording usages of various services by a user, and particularly for recording the role adopted by the user while interacting with each service. Because the user may generate a great amount of information during an interaction with a service, some techniques are presented for streamlining the tracking, usage reporting, and recording mechanisms of the utilized services and the usage database in order to tailor the amount of exchanged communication to the desired information, thereby reducing the computational burdens and improving the performance of the system. Some variations of this technique are also discussed that may present various advantages and/or mitigate various disadvantages.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
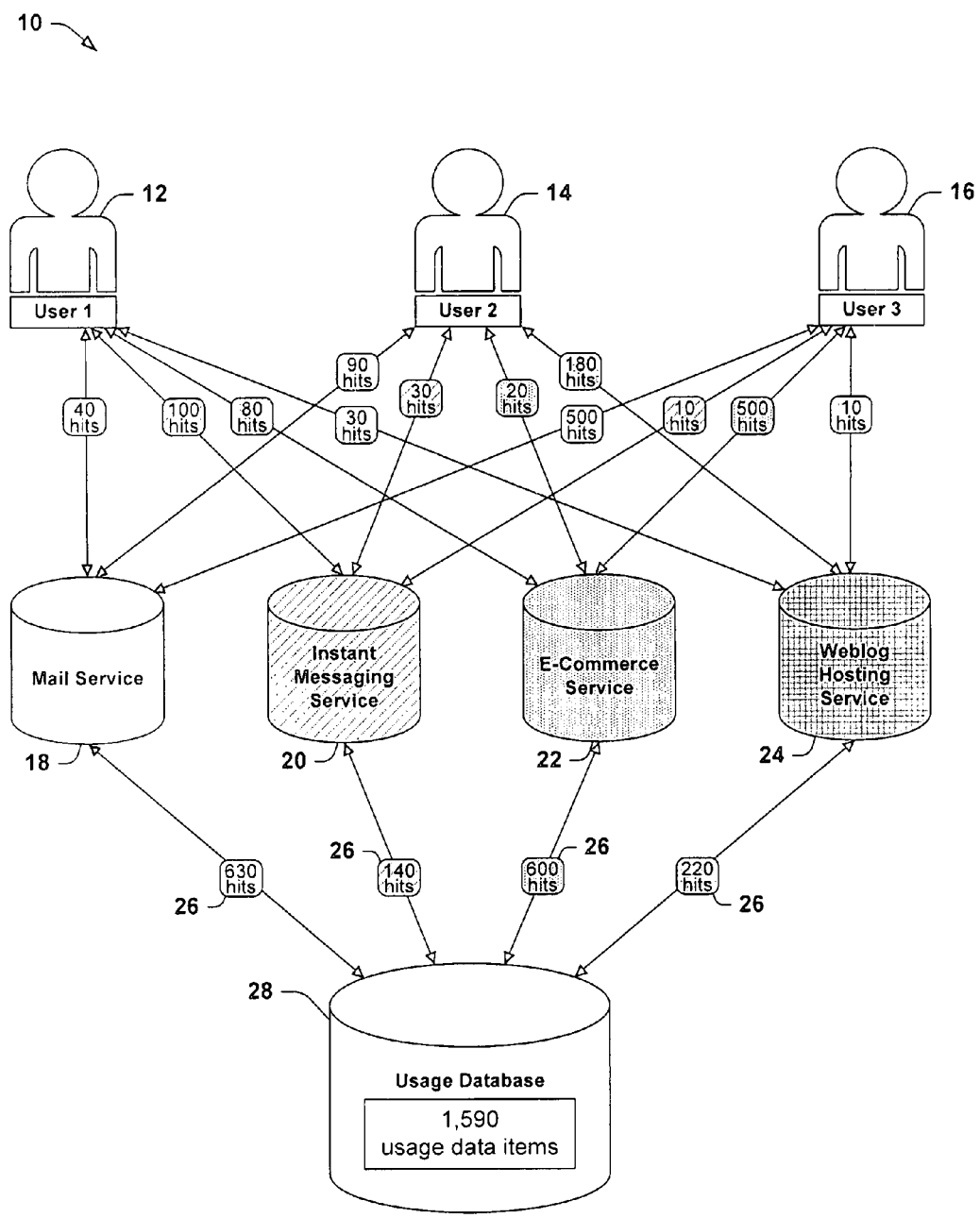
FIG. 1 is a system component diagram illustrating an exemplary system for recording usages of services by users that does not utilize the techniques described herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As previously noted, various computing services may be available to users who interact with the services in different ways, and particularly in different roles. For example, a user may subscribe to and utilize an email service, an instant messaging service, a news service, and a weblog hosting service. A provider of such a variety of services may devise a centralized user profile database to track the interactions of a user with the provided services. The provider may therefore wish to devise a centralized database that tracks each user's interactions with each service, which may inform many aspects of the service hosting. For example, the provider may choose to allocate computing resources or to develop new types of services based on the users' utilization of the various services.

FIG. 1 illustrates an exemplary system 10 for handing interactions between users, services, and a centralized database that tracks utilization of the services by the users. For convenience, the items related to each service are similarly shaded; for example, the items related to the instant messaging service are presented with a striped appearance, while the items related to the e-commerce service are stippled. It will be appreciated that here, as elsewhere in this disclosure, "user" may refer to an individual, or to a group of individuals (such as a company or organization), or to a computer configured to utilize the services in an automated manner, or any combination thereof. Also, "service" generically denotes a functionality provided to one or more users, and may comprise one or more computers, individuals, businesses or organizations, etc. cooperating to provide the functionality. Similarly, "database" is used to refer to a store of data, and not to a particular computer system, software, architecture, schema, format, etc. for holding such information. The database may also comprise a plurality of replicated databases configured to store the same data for redundancy and improved performance in access, and/or a plurality of databases configured to store different sets of data, such as user profiles for different sets of users, or different portions of a user profile (e.g., one database storing public information about users, and another database storing private information about the same users.) The database may also communicate with users and services according to various techniques. For example, users and services may communicate directly with the database, such as through an Open Database Connectivity (ODBC) connection, and such as in a standardized language such as SQL; the users and services may access one or more programmatic interfaces, such as stored procedures; and/or the users and services may communicate with the database indirectly through an intermediary interface, such as a web service or a webserver configured to manage access to the database. Many such variations may be devised by those of ordinary skill in the art that incorporate the service usage tracking concepts described herein.

Each access of the service by a user is referred to as a service "hit," which represents a quantifiable service provided for the purpose of explanation. For example, a webserver may represent each "hit" as a webpage generated and served to a user. However, it will be appreciated that various types of services communicate in different forms, and each "hit" may be measured in various ways (e.g., a megabyte of data transmitted by a file server.) The use of each service by a user involves a measurable amount of communication with the service. Each service may measure its communication as webpages prepared and sent to each user; and while a service is typically offered by a computer having a large amount of computational power, including processing resources (e.g., processing power) and network capacity (e.g., bandwidth), the total amount of computation that a service may be capable of providing, while potentially quite large (e.g., a million webpages per minute), is nevertheless finite. The computational burden is carefully managed by the service administrators, since overused services may lead to poor performance (long webpage service times that degrade the user experience) and denial of service (communications failures, such as page timeouts.)

In the exemplary system of 10 illustrated in FIG. 1, three users 12, 14, 16 communicate with a mail service 18, an instant messaging service 20, an e-commerce service 22 (e.g., a site for exchanging funds in online transactions), and a weblog hosting service 24. The usages of the services by each user 12, 14, 16 impose a different computational burden on each service, as illustrated in FIG. 1. The first user 12 operates as a typical user of each service, involving a moderate communication per day with the mail server 18 (40 service hits), both video and text communication via the instant messaging service 20 (100 service hits), the e-commerce server 22 (80 service hits), and the weblog hosting service 24 (30 service hits.) The second user 14 operated as a professional weblogger, involving a lighter amount of communication per day with the instant messaging service 20 (30 service hits) and the e-commerce server 22 (20 service hits), but a heavier amount of communication with the mail service 18 (90 service hits) and the weblog hosting service 24 (180 service hits.) The third user 16 operates as a professional e-commerce business, involving a small amount of communication with the instant messaging service 20 (10 service hits) and the weblog hosting service 24 (10 service hits), but a much larger amount of mass-mail communication with the mail service 19 (500 service hits) and the e-commerce service 22 (500 service hits.)

In this exemplary system 10, each service 18, 20, 22, 24 communicates the usages of the service by the users 12, 14, 16 to a usage database 28 (which collectively describes the data storage mechanisms and the server interface with the services), which records information on how each user 12, 14, 16 is using each service 18, 20, 22, 24. However, each service 18, 20, 22, 24 attempts to communicate a usage data set to the usage database 28 for each webpage served to each user 12, 14, 16, thereby imposing a computational burden on the usage database 28 proportional to the communication of each service 18, 20, 22, 24 with all of the users 12, 14, 16. Hence, the mail service 18 in this example 10 might attempt to contact the usage database 28 for each message sent by each individual 12, 14, 16, leading to 630 usage data sets. Similarly, the instant messaging service 20 sends a total of 140 usage data sets 26 to the usage database 28, the e-commerce service 22 sends a total of 600 usage data sets 26 to the usage database 28, and the weblog hosting service 24 sends a total of 220 usage data sets 26 to the usage database 28. Thus, in this exemplary system 10, the usage database 28 is sent 1,590 usage data sets 26 from the four services 18, 20, 22, 24 due to the routine utilization of each service by three users 12, 14, 16. Such a system cannot easily scale to track the utilization of dozens of services by millions of users per hour. This exemplary system 10 doubles the computational burden placed on each service 18, 20, 22, 24, where each service sends a usage data set 26 to the usage database 28 for each webpage served to a user. Moreover, the 1,590 usage data sets 26 stored in the usage database 28 might be unnecessarily detailed; for example, specific information about each email sent by each user might not be particularly useful for usage-based business decisions.

An alternative usage tracking system may be devised to streamline the information sent to and stored in the usage database. It may be apparent from the example of FIG. 1 that users often choose to interact with services in a different role. For example, one user might adopt a personal communications role while communicating with a mail service and an e-commerce service, while another user might adopt a professional communications role while communicating with the same mail service and e-commerce service. Moreover, each service may be able to detect the role adopted by each user according to various usage patterns. For example, the mail service may ascertain that a personal mail user typically sends messages to a small set of frequent contacts, whereas a business user typically sends a heavier volume of messages to a wider variety of recipients and occasionally sends mass email messages. Similarly, an e-commerce service might differentiate between personal buyers (those who send small amounts of money in varying frequencies), personal sellers (those who receive small amounts of money in varying frequencies), and professional buyers and sellers (those who make many transactions on a steadier schedule.) It may be more advantageous to track users by the roles adopted while interacting with each service, and for each service to characterize the usage of the service based on each user's interaction with the service. Thus, the usage database may only record a few usage data sets for each individual in a given time period (e.g., per day) to indicate the role of the user in utilizing each service. In the example 10 of FIG. 1, instead of tracking each of the 500 pages served to a commercial e-commerce user 16 by an e-commerce server 22, the usage database 28 may simply record one record to indicate that the user 16 interacted with the e-commerce service 22 as a professional e-commerce merchant on a given day.

Additionally, it maybe advantageous to redistribute the computational burden between the services, the users, and the usage database. In FIG. 1, the usage tracking effectively doubles the computational burden of each service 18, 20, 22, 24, which sends a usage data set to the usage database 28 for each webpage provided to a user 12, 14, 16. Instead, the computational burden may be shared with the user by instructing each user to send usage data sets to the usage database. Also, if the usages are characterized on a coarser level of granularity, the system may be organized to limit the sending, processing, and recording of redundant messages. For example, the professional e-commerce merchant 16 might interact with the e-commerce service 22 as many as 500 times in one period, but the system may be configured to prevent the sending and processing of such redundant usage data sets to the usage database 28.

Figure 2:
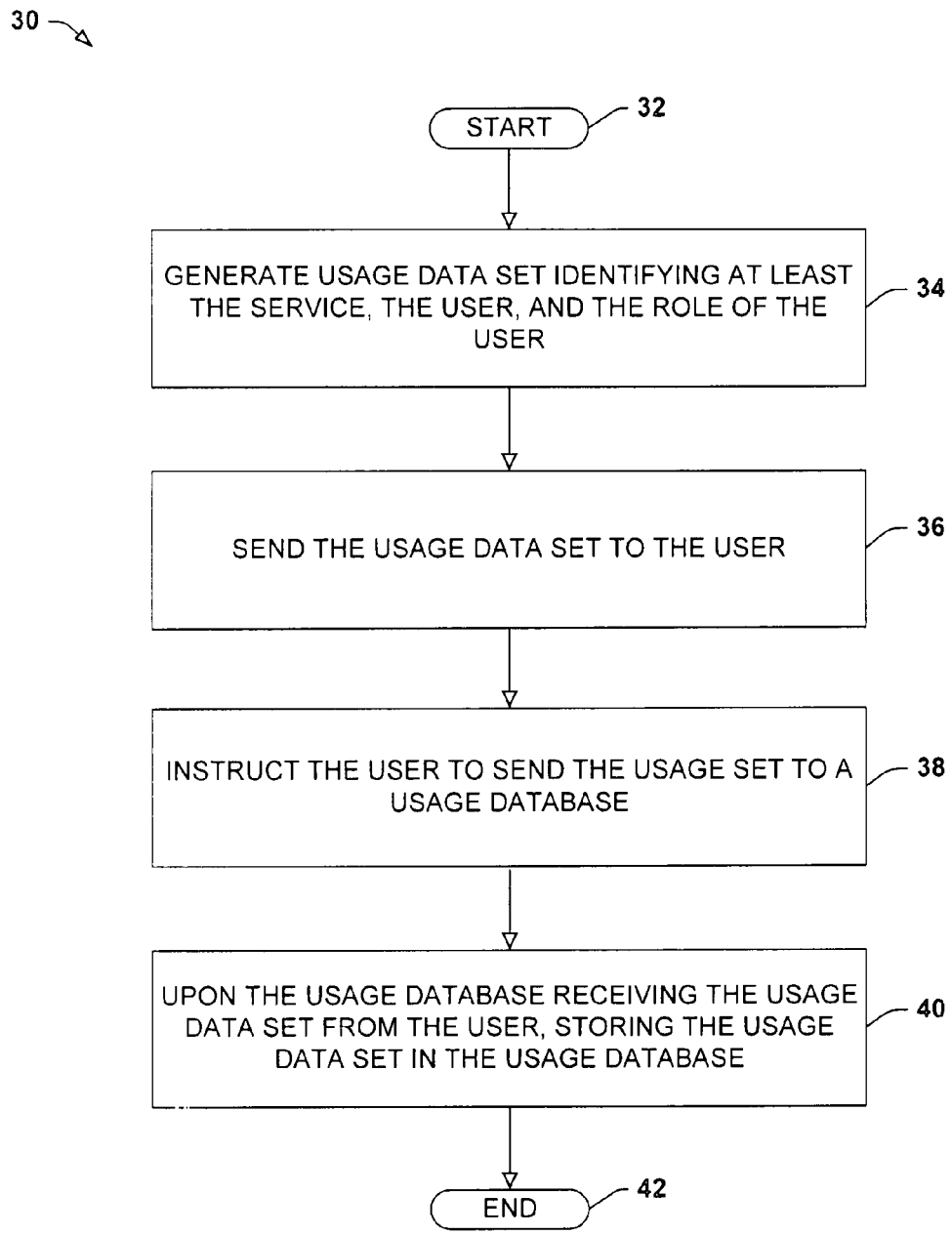
FIG. 2 is a flowchart illustrating an exemplary method for recording a usage of a service by a user.

FIG. 2 illustrates a method that may be adapted to incorporate these techniques for service usage tracking, and may have some of the corresponding advantages. The flowchart of FIG. 2 describes an exemplary method 30 of recording a usage of a service by a user. The method 30 begins at 32 and involves generating a usage data set identifying at least the service, the user, and the role of the user 34. The method 30 also involves sending the usage data set to the user 36. The method 30 also involves instructing the user to send the usage data set to a usage database 38. The method 30 also involves, upon the usage database receiving the usage data set from the user, storing the usage data set in the usage database 40. Having generated a usage data set describing (inter alia) the role of a user in interacting with a service, and having arranged for the usage data set to be sent to and recorded in a usage database, the method 30 achieves the purpose of recording the usage of the service by the user, and so ends at 42.

Figure 3:
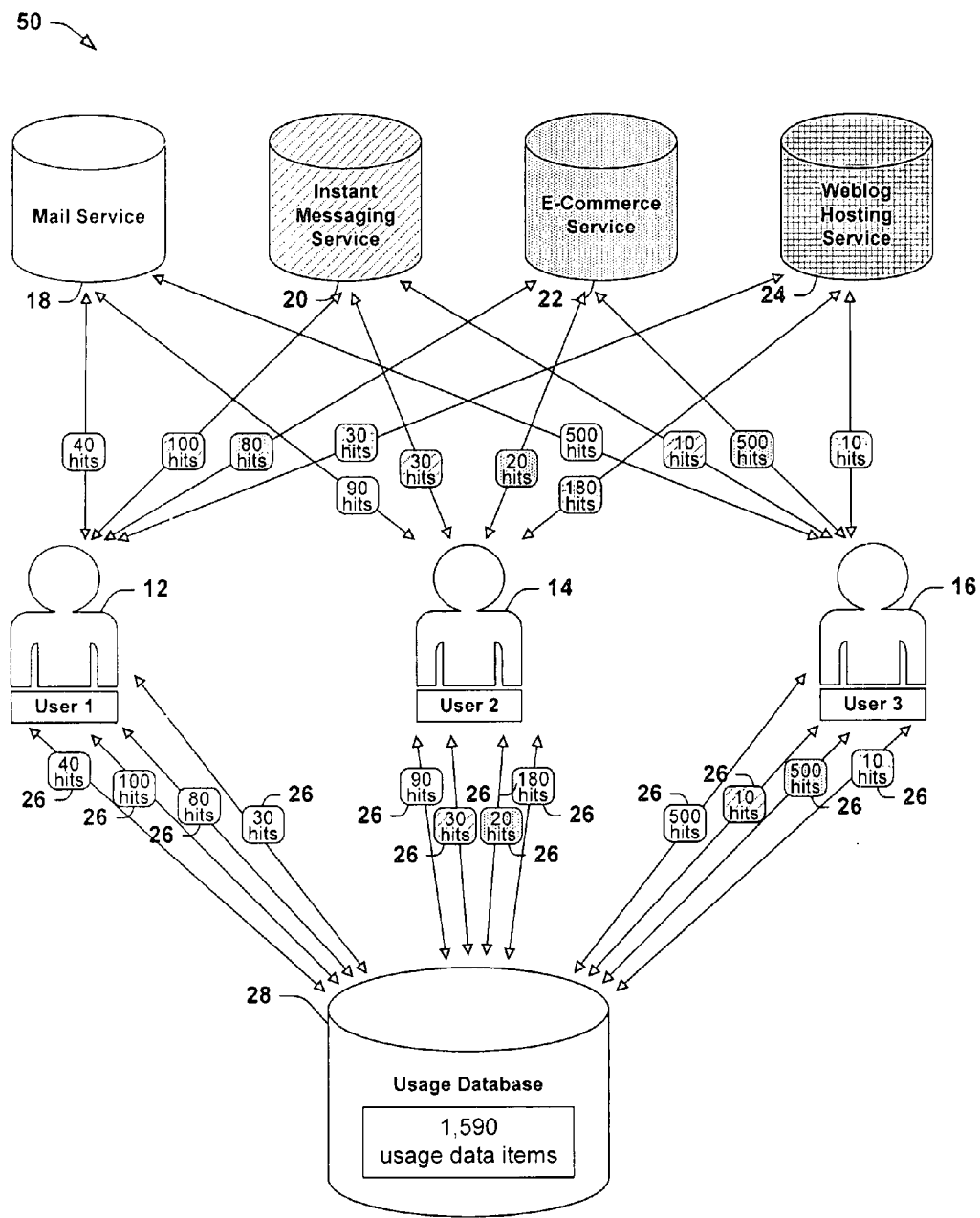
FIG. 3 is a system component diagram illustrating an exemplary system for recording usages of services by users that utilizes the techniques described herein.

FIG. 3 illustrates an exemplary system 50 similarly configured to incorporate the techniques described hereinabove. The exemplary system 50 of FIG. 3 also illustrates the interaction of three users 12, 14, 16 with four services 18, 20, 22, 24 and a usage database 28. However, the communications flow in the exemplary system 50 of FIG. 3 differs from the communications flow in the exemplary system 10 of FIG. 1 by redistributing some of the computational burden with the users 12, 14, 16. When each user 12, 14, 16 contacts a server 18, 20, 22, 24, the server 18, 20, 22, 24 includes the usage data set in the data sent back to the user (e.g., the webpage that is sent for the user to view the results of the requested action), along with an instruction for the user to forward the usage data set to the usage database 28. As a result, the computational burden of the usage tracking on the servers 18, 20, 22, 24 is reduced.

Systems devised to take these principles into account, such as the exemplary system 50 of FIG. 3, may be implemented in many ways. The services 18, 20, 22, 24 are listed as providing mail, instant messaging, e-commerce, and weblog hosting services, but any suitable service may be included, such as file or web hosting, internet proxying, newscasting, web conferencing, user or service authentication services, encryption services, telephony services such as voice-over-IP, etc. The services may also be provided to users through other services; for example, an internet payment exchange service might be provided to a user as part of an auction service. Moreover, the services that may be included in this system are not limited to web-based services that communicate with users via a web browser. For example, the mail service might be accessible to a user's mail client, which may interface with the mail server in the background and then present sent and received mail to the user. Such services may not even provide meaningful communication to the user; for example, a mail sending service might function primarily to accept messages from the user and to transmit them to others, while a virtual private network service might provide a secure communications channel in a secure manner. Many such services may be included in systems designed in accordance with the techniques presented herein.

The usage data set that is transmitted to the user for sending to the usage database may also comprise various implementations. As one variation, the contents of the usage data set may vary. While the usage data set typically includes identifiers for the service, the user, and the role of the user in interacting with the service. However, the details of each item may vary pursuant to the nature of the service and the characteristics of the implementation. For example, the user may be identified by name, or by an arbitrarily chosen username, or (for services focused on anonymization) by an identifier that allows tracking of the user without identifying the person. Also, other forms of data may be included that may be valuable in usage assessments, such as the date of the usage, the time or time range (e.g., "morning") of the usage, demographic data about the user (age, sex, profession, geographic location, etc.), and the details of the usage (duration, bandwidth consumed, pages served, etc.) As another variation, the usage data set may comprise a structured file, such as an XML document, that relates information according to a predefined schema; or as text strings identifying various data items, such as headers included in an HTTP POST exchange or parameters provided in an HTTP GET query; or as values provided as parameters to a web service; etc. The characteristics of the usage data file may vary in many ways in many systems incorporating the techniques presented herein.

It may be noted that the total amount of network communication is the same in this exemplary system 50 as in the previous exemplary system 10 of FIG. 1. However, the redistributed communications flow may serve as the basis for additional improvements for streamlining the amount of data exchanged in such systems. The exemplary system 10 of FIG. 1 is configured to report usage, and to exchange usage data sets, based on the details of the service access, such as the URLs accessed from a webserver. It may be anticipated that most interactions of a user with a service will involve a distinctive data exchange; for example, a user browsing a website hosted by the service rarely requests the same pages repeatedly, but rather requests a variety of webpages, each having a distinctive URL. Similarly, for web services that render pages from a dynamic database (e.g., a web forum or RSS feed), the user might request the same database accessor page repeatedly, but may receive different results upon each access. However, if the usage is tracked according to the role of the user in interacting with the site, then the granularity of the usage tracking may be much coarser, and may generate many more similar usage data sets for various service accesses within the same role.

Accordingly, a service may be configured to generate consistent usage data sets for respective usages of the service by a user in a role. For example, when a user 12 browses a weblog on the weblog hosting service 24, rather than reporting the access of each webpage as a separate usage data set, the weblog hosting service 24 might report that the user 12 interacted with the weblog hosting service 24 as a reader. On the other hand, when the user 12 authors several posts on a weblog provided by the weblog hosting service 24, rather than reporting usage data sets representing the details of each post, the weblog hosting service 24 might report that the user 12 interacted with the weblog hosting service 24 as a weblog author. As a result, the coarser level of granularity in role-based usage reporting may provide many identical usage data sets for repeated usage of a service by a user adopting the same role, instead of many unique usage data sets due to various accesses of a service by a user functioning in the same role for each access.

A role-based focus in usage reporting may be utilized to streamline network communication and to reduce the computational burden of the usage tracking system. Various components of the system may be configured to compare a usage data set with previously sent, received, or recorded usage data sets, and may prevent the further processing of usage data sets that are consistent with previously processed usage data sets. For example, a usage data set may comprise a usage descriptor such as "on date DD/MM/YYYY, user 12 interacted with weblog hosting service 24 as a weblog author." Various components of the system may be configured, upon receipt of this usage data set, to compare this usage data set with previously received usage data sets, and if an identical data set was previously received, the component may prevent retransmission of the usage data set. In this manner, the component may reduce the retransmission of redundant usage data sets and reduce the computational burden of the usage tracking system.

Figure 4A:
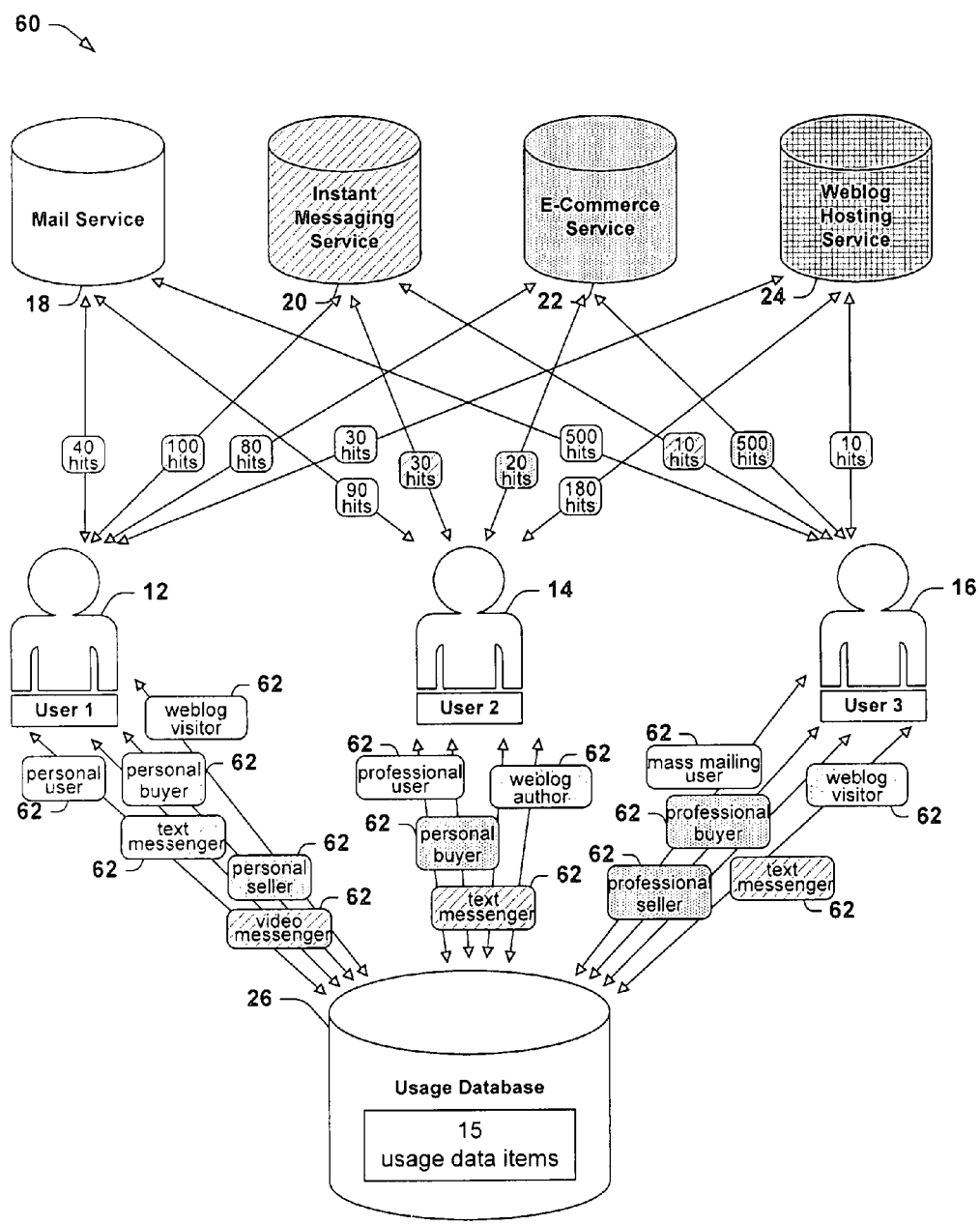
FIG. 4A is a system component diagram illustrating another exemplary system for recording a usage of a service by a user.

FIG. 4A illustrates another exemplary system 60 of recording a usage of a service by a user. The exemplary system 60 of FIG. 4A again illustrates the interaction of three users 12, 14, 16 with four services 18, 20, 22, 24 and a usage database 28. However, in this exemplary system 60, the usage data sets 62 are generated based on the role of the user in interacting with the service, and the services 18, 20, 22, 24 are configured to generate consistent usage data sets 62 for each usage of a particular service by a particular user in a particular role. Moreover, it is presumed that one or more components of the exemplary system 60 are configured to prevent redundant processing of consistent usage data sets. For example, for each interaction of the first user 12 with the mail service 18 as a personal user, a consistent usage data set 62 is generated; moreover, one or more components of the system 60 are configured to transmit the first such usage data set 62, while each consistent usage data set 62 that follows is recognized as redundant, and not processed. As a result, for the set of interactions of the first user 12 with the mail service 18 in the role of a personal user (40 total records), only one usage data set is propagated to the usage database 28 and stored therein. As a result, the utilization of the four services 18, 20, 22, 24 by the three users 12, 14, 16 leads to the storage of only 15 usage data sets 62 in the usage database 28.

A comparison of the exemplary system 60 of FIG. 4A with the exemplary system 50 of FIG. 3 will reveal that characterizing the service usage by the role adopted by the user may reduce the computational burden of the usage tracking system. The computational savings arises from the reduced set of information comprising the usage data set, which results in redundant usage data sets for similar service usages. However, it may be advantageous to include additional information in the usage data sets, such as the date of the usage, the time of the usage, and additional information about the nature of the usage (e.g., the types of weblogs that a weblog visitor chooses to visit.) It may be appreciated that a tradeoff exists between the reduction in the computational burden due to limiting the information represented by each usage data set and the added value of including additional information in each usage data set. Implementations in accordance with these techniques may therefore involve a careful evaluation of the value proposition of adding additional information items vs. restricting the size of the usage data set to economize computational resources.

The techniques described above may be embodied in a variety of implementations, each of which may have some advantages or may avoid some disadvantages. As one example, the limiting of the transmission of redundant usage data sets may be embodied in various aspects, such as in various components of the exemplary system 60 of FIG. 4. An exemplary implementation is illustrated (collectively) in FIGS. 4B-4E, and two alternative implementations are illustrated in FIGS. 4F and 4G. However, it will be appreciated that some aspects of these techniques may be combined, or coupled with other implementations presented herein, to devise embodiments having multiple, and perhaps complementary, advantages.

FIGS. 4B-4E together illustrate a first implementation of a system for recording a usage of a server by a user; together, these views represent one implementation of reduced transmission of redundant role-based usage data sets illustrated in FIG. 4A. This exemplary system 70 illustrates a usage of an instant messaging service 72 by a user 74 having adopted a particular role, resulting in one or more usage data sets in a usage database 76 as previously described. This exemplary system 70 also involves a configuration of the user that includes a usage data set cache 78, which comprises a memory of the usage data sets that have previously been sent to the usage database 76. Moreover, in this exemplary system 70, the removal of redundant usage data sets is performed by the user 74.

Figure 4B:
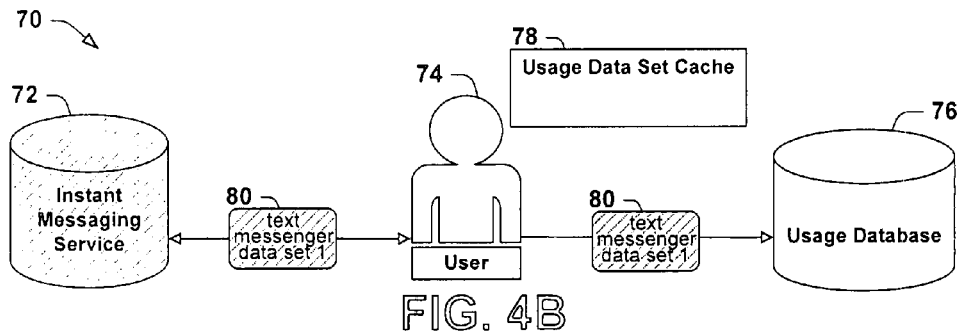
FIG. 4B-4E together illustrate a system component diagram illustrating yet another exemplary system for recording a usage of a service by a user.
Figure 4C:
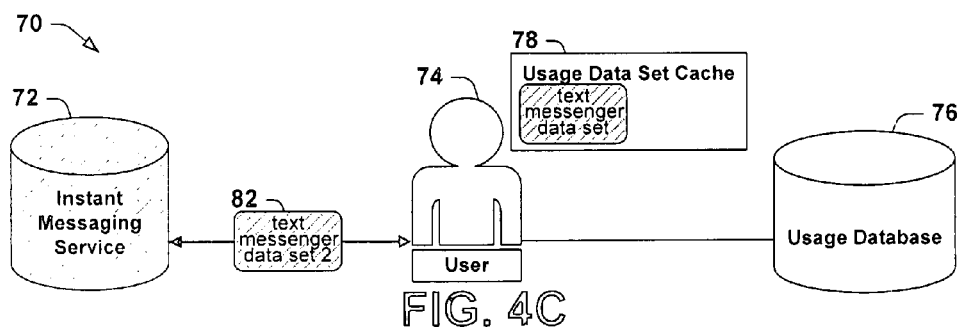
Figure 4D:
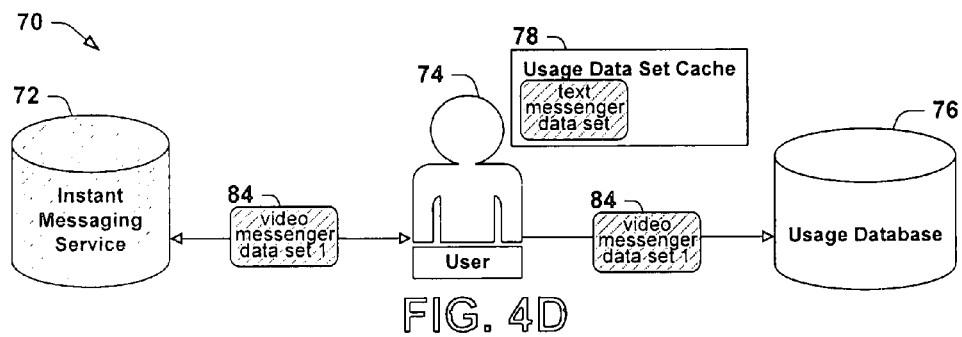
Figure 4E:
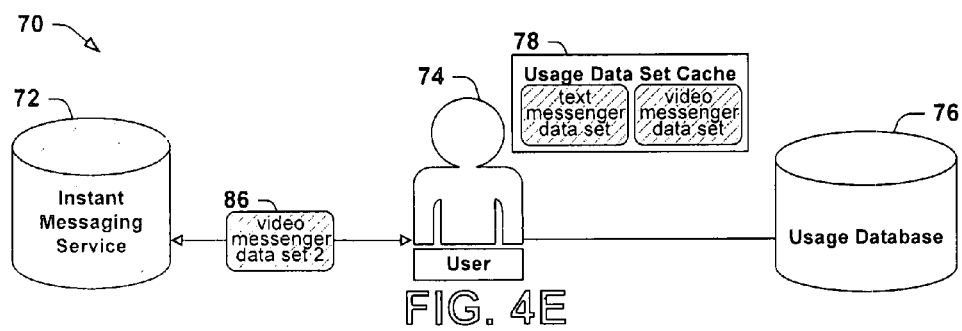
Figure 4F:
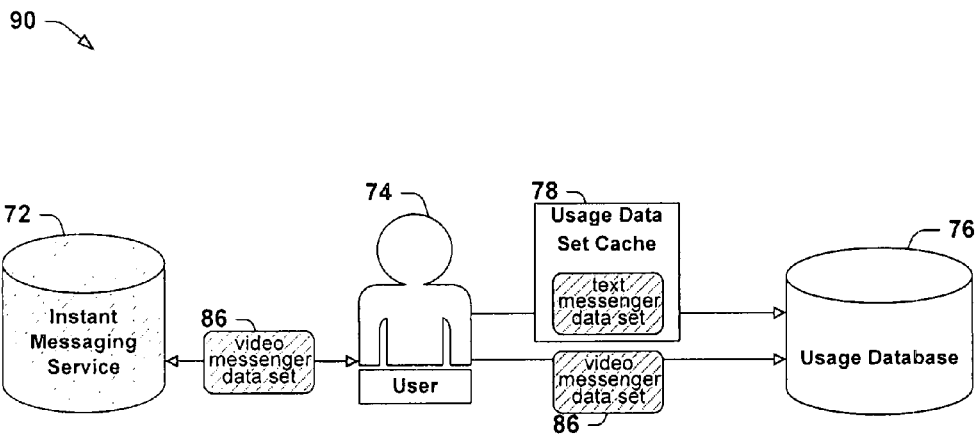
FIG. 4F is a system component diagram illustrating yet another exemplary system for recording a usage of a service by a user.
Figure 4G:
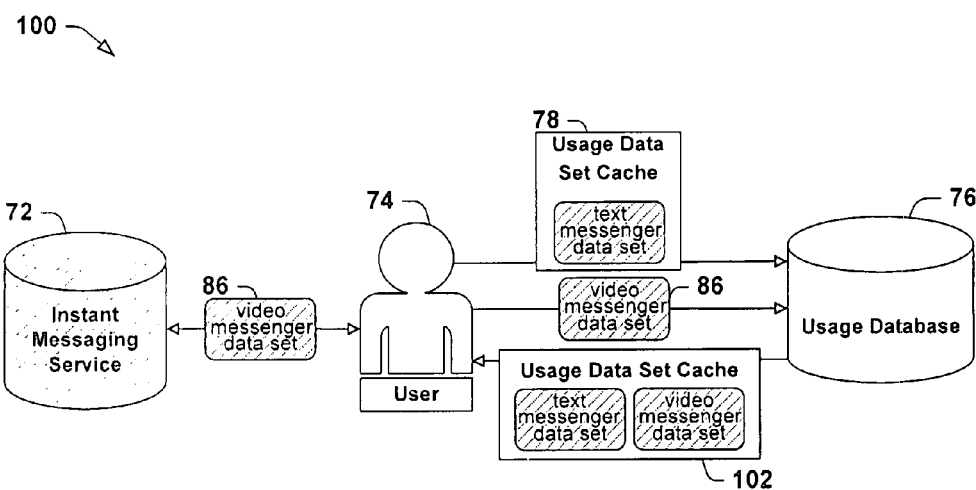
FIG. 4G is a system component diagram illustrating yet another exemplary system for recording a usage of a service by a user.

Each of FIGS. 4B-4E illustrates one interaction between the user 74, the instant messaging service 72, and the usage database 76. The first interaction is illustrated in FIG. 4B, where the usage data set cache 78 is empty. The user 74, adopting the role of a text messenger, initiates a text message utilization of the instant messaging service 72. The instant messaging service 72 generates a first usage data item, comprising a first text messenger data set 80, and sends it to the user 74 with an instruction for the user to send the first text messenger data set 80 to the usage database 76. The user 74 receives the first text messenger data set 80 and examines the usage data set cache 78 to see if this usage data set has already been sent to the usage database 76. Finding the usage data set cache 78 to not contain the text messenger usage data set, the user 74 forwards the text messenger data set 80 to the usage database 76. The user 78 also adds the text messenger usage data set to the usage data set cache 78. FIG. 4C illustrates the second interaction between the user 74, the instant messaging service 72, and the usage database 76. The user 74, still adopting the role of a text messenger, initiates a second interaction with the instant messaging service 72, which sends a second text messenger usage data set 82. The user 74 receives the second text messenger usage data set 82 and the instruction from the instant messaging service 72 to forward the usage data to the usage database. The user 74 checks the usage data set cache 78, and this time finds the text messenger usage data set present. Therefore, the user 74 prevents the forwarding of the second text messenger usage data set 82 to the usage database 76, as this would be redundant. FIG. 4D illustrates the third transaction, in which the user 74, now in the role of a video messenger, interacts with the service 72 and receives a first video messenger usage data set 84. Not finding such a usage data set in the usage data set cache 78, the user 74 forwards the first video messenger usage data set 84 to the usage database 76, and also adds this usage data set to the usage data set cache 78. In the fourth interaction, illustrated in FIG. 4E, the user 74, still in the video messenger role, initiates another video usage of the instant messaging service 72, but finding the video messenger usage data set already in the usage data set cache 78, the user 74 prevents the sending of the second video messenger usage data set 86 to the usage database 76. This implementation may allow each user to monitor the types of usage data sets that the user receives from a variety of services, and to prevent the transmission of redundant usage data sets the usage database, thereby economizing the computational burden for both the usage database and the user.

FIG. 4F presents another exemplary system 90 that again illustrates a usage of an instant messaging service 72 by a user 74 in the role of a video messenger, resulting in the generation of a video messenger usage data set 86 that is sent to the usage database 76. This exemplary system 90 of FIG. 4F also includes in the configuration of the user 74 a usage data set cache 78 in which the user records usage data sets that have been sent to the usage database 76. However, in this exemplary system 90, the user 74 does not check whether the usage data set is located in the usage data set cache 78 and has previously been sent to the usage database 76. Rather, the user 74 sends the usage data set cache 78 to the usage database 76 along with the usage data set 86, and the usage database 76 checks the usage data set cache 78 to see if it contains the accompanying usage data set 86. If so, then the usage database 76 declines to record the usage data set 86 in the usage database 76, as the usage data set 86 is redundant. While this exemplary system 90 may cause some additional network utilization due to the sending of the usage data set cache 78 to the usage database 76, the computational burden of checking the usage data set cache 78 is offloaded from the user 76, which may be advantageous in some configurations.

FIG. 4G presents yet another exemplary system 100 featuring another variation of this technique, and once again illustrates a usage of an instant messaging service 72 by a user 74 in the role of a video messenger, resulting in the generation of a video messenger usage data set 86 that is sent to the usage database 76. This exemplary system 90 also features a user 74 configured to store previously sent usage data sets in a usage data set cache 78. Again, as in the example of FIG. 4F, the usage data set cache 78 is sent to the usage database 76 along with the usage data set 86, and the usage database 76 determines whether or not the usage data set 86 are to be written to the usage database 76 based on the contents of the user's usage data set cache 78. However, in this implementation, the user does not add usage data sets to the usage data set cache 78. Rather, the usage database 76 manages the usage data set cache 78 on behalf of the user; when the user sends the usage data set cache 78 and the usage data set 86, the usage database sends to the user an updated usage data set cache 102 that includes the most recently sent usage data set 86. While this exemplary system 100 may again consume more computational resources than in previous examples, it may be advantageous for centralizing the management of the usage data set cache 78 by the usage database 76; accordingly, the usage database 76 has more control over which kinds of data the user 74 may send it in the future, and the computational burden placed upon the user 74 is again reduced.

The usage data set cache described above and included in the examples of FIGS. 4B-4E, 4F, and 4G may be implemented in many ways, based on the configuration of the various services, the users, and the usage database. In configurations involving primarily web-based services, the user's web browser cache may be used for this task. For example, the user may be configured to contact the usage database by sending an HTTP request for a particular URL that contains the usage data set cache, e.g., as part of an HTTP GET query. Accordingly, two usage data sets representing the same type of interaction (i.e., an interaction of a particular user with a particular service in a particular user role) may present the same HTTP GET query, and therefore may be resolved to the same URL. The user's web browser may therefore prevent sending redundant usage data sets by resorting to the cached response of the previous URL access. This implementation resembles the exemplary system of FIGS. 4B-4E by inducing the redundant usage data set culling at the user, thereby preventing the user from sending redundant usage data sets to the usage database. As a second example, the usage data set cache may comprise one or more cookies placed in the user's cookie cache, and that describe one or more usage data sets that have previously been sent. The cookies do not necessarily contain the entire contents of each previously sent usage data set; for example, the cookie may contain one or more hashcodes of previously sent usage data sets, and the hashcodes of new usage data sets may be compared with the cookies that together comprise the usage data set cache. As in the exemplary system 90 of FIG. 4F, the user 74 may be configured to send the one or more cookies to the usage database 76, which may compare the new usage data set with the cookies to check for redundancy. Additionally, as in the exemplary system 90 of FIG. 4G, the usage database 76 may send the user 74 one or more new cookies that include the usage data set for this interaction. Many various implementations of the usage data set cache may be devised by those of ordinary skill in the art that operate in accordance with the techniques discussed herein.

Another implementation aspect that may be included in the techniques described herein relates to the authentication of the usage data set. The services included in the usage tracking system may generate the usage data sets and rely on the users to forward the usage data sets to the usage database. However, the transmission path of the usage data sets through the users provides an opportunity for users to tamper with the contents of the usage data sets, and possibly to generate forged usage data sets for sending to the usage database. It may be advantageous to include an authentication mechanism in such systems, whereby the usage database can verify that a usage data set sent to it by a user was authored by the service identified therein, and was not altered en route. One implementation of this system involves the addition of authentication data to the usage data set. For example, each service may prepare an RSA public/private key pair, and may send its RSA public key to the usage database. The services may then include authentication data in the usage data set, in the form of a digital signature of the contents of the usage data set, prepared using the RSA private key of the service. The usage database may then verify the digital signature against the RSA public key of the service, and may proceed with processing usage data sets with digital signatures matching the contents of the usage data set, while discarding usage data sets with unmatching contents.

Figure 5:
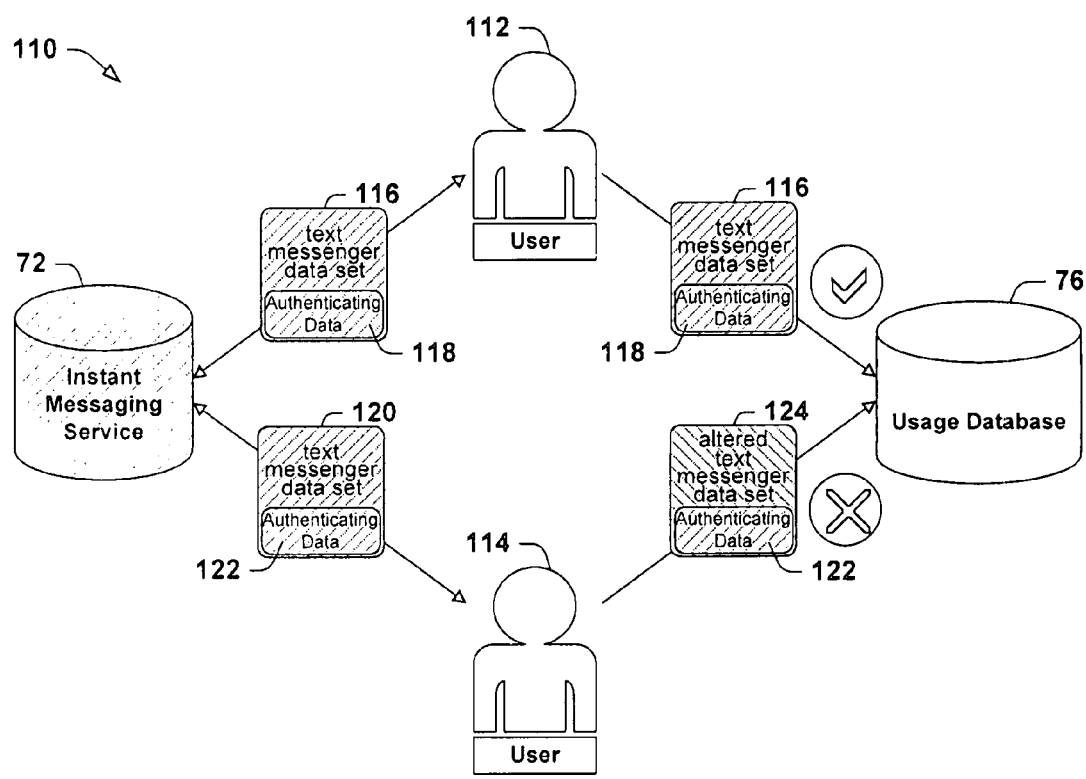
FIG. 5 is a system component diagram illustrating yet another exemplary system for recording a usage of a service by a user.

FIG. 5 illustrates an exemplary system 110 of recording a usage of a server by a user that includes the technique of usage data sets comprising authentication data. In this exemplary system 110, two users 112, 114 interact with an instant messaging service 72 and provide usage data sets to a usage database 76. The first user 112 communicates with the instant messaging service 72 as a text messenger, and receives a text messenger usage data set 116 that identifies the first user 112 as having utilized the instant messaging service as a text messenger. This text messenger usage data set 116 includes authentication data 118 that the instant messaging service 72 has generated to authenticate the contents of the text messenger usage data set 116 to the usage database 76. The first user 112 forwards to the usage database 76 in unaltered form; when the usage database 76 receives the text messenger usage data set 116 from the first user 112, it verifies the contents of the text messenger usage data set 116 using the authentication data 118. Because the contents of the text messenger usage data set 116 match the authentication data 118 (e.g., the digital signature of the usage data set matches the contents of the data set), the usage database 76 concludes that the text messenger usage data set 116 is unaltered, and therefore proceeds with processing. The second user 114 also interacts with the instant messaging service 72 in the role of a text messenger, and therefore receives a text messenger usage data set 120 identifying the second user 114 as having utilized the instant messaging service 72 in the role of a text messenger. This text messenger usage data set 120 also includes authentication data 122 that authenticates the formation of the text messenger usage data set 120 as having been created by the instant messaging service 72. The second user 114 receives this video messenger usage data set 120, but alters the contents of the usage data set, and forwards to the usage database an altered text messenger usage data set 124. However, the usage database 76 attempts to verify the altered text messenger usage data set 124 with the authentication data 122 included therein. However, the verification fails, because the contents of the data set do not match the authentication data; therefore, the usage database 76 may disregard the altered text messenger usage data set 124.

Figure 6A:
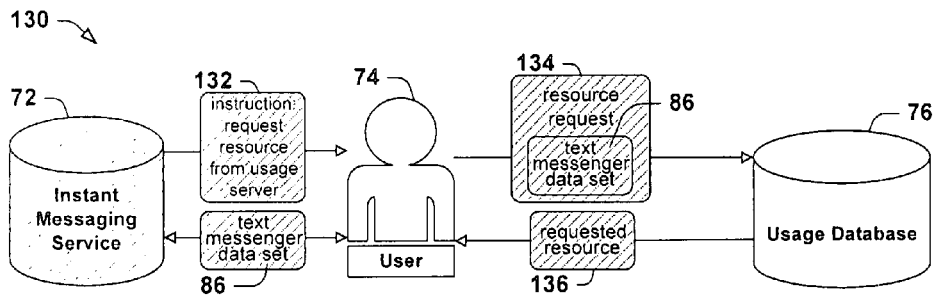
FIG. 6A is a system component diagram illustrating yet another exemplary system for recording a usage of a service by a user.

Yet another aspect of the implementation of these techniques that may be presented in various configurations relates to the manner of instructing the user to send the usage data set to the usage database. Many techniques may be devised for delivering the usage data set to the user, and for arranging for the user to retransmit the usage data set to the usage database. FIG. 6A illustrates one set of embodiments, illustrating a usage of a text messaging service 72 by a user 74 in a text messenger role, and resulting in a text messaging usage data set 86 that is recorded in a usage database 76. In this exemplary implementation 130, the instruction 132 comprises an instruction to the user 74 to request a particular resource from the usage database 76, and to provide the text messaging usage data set 86 to the usage database 76 as part of the resource request. The user 74 therefore issues the resource request 136 to the usage database 76, wherein the resource request 134 includes the text messaging usage data set 86, and the usage database 76 responds by providing the requested resource 136.

One exemplary embodiment of this technique is illustrated in FIG. 6B, which again illustrates a usage of a text messaging service 72 by a user 74 in a text messenger role, and resulting in a text messaging usage data set 86 that is recorded in a usage database 76. In this exemplary implementation 140, the resource request involves the decryption of an important element of the instant messing service 72, such as an instant message. The service 72 is configured to encrypt the element with an RSA public key, and the user 74 may be instructed to send both the text messenger usage data set 86 and the encrypted element 144 to the usage database 76, which holds the RSA private key. Upon receiving the request 146 to decrypt the encrypted element 144 and the text messenger data set 86, the usage database may perform the decryption and return the decrypted element 148 to the user 76. If the text messenger usage data set 86 includes authentication data, the usage database 76 may further be configured to authenticate the text messenger usage data set 86 with the authentication data before returning the requested resource 136. In a similar embodiment, the encrypted element 144 may actually contain both the element used to utilize the service 72 and the text messenger usage data set 86. While these embodiments improve the chances of the user 74 complying with the instruction 142 to forward the text messenger usage data set 86 to the usage database 76; however, these embodiments also place some computational burdens (e.g., decrypting encrypted items) on the usage database 76 that are unrelated to the usage tracking, which may impose an extra computational burden on the usage database 76.

Figure 6B:
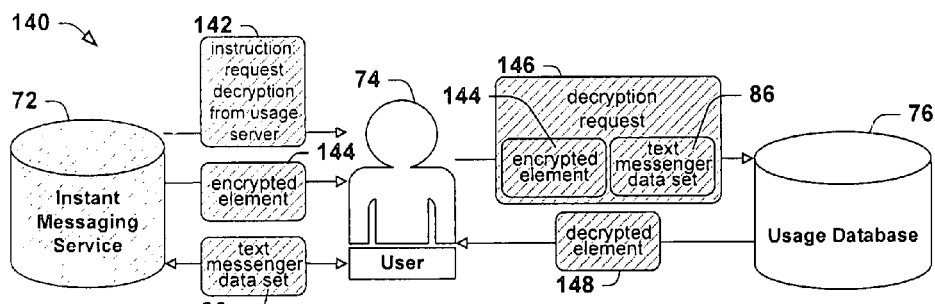
FIG. 6B is a system component diagram illustrating yet another exemplary system for recording a usage of a service by a user.
Figure 6C:
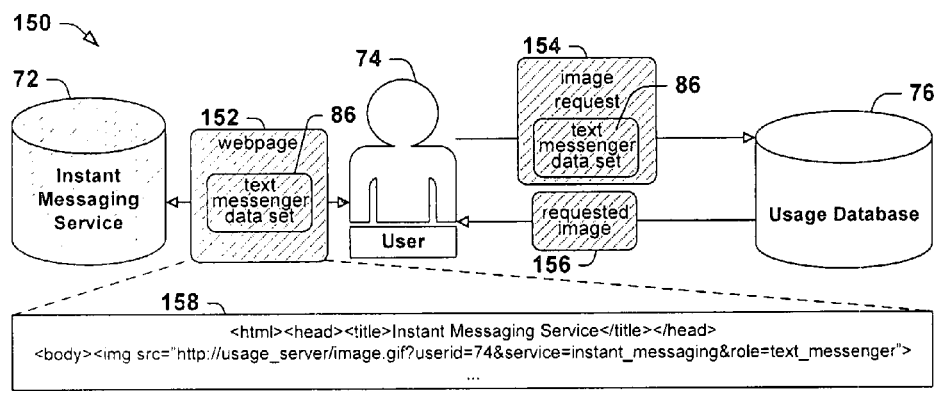
FIG. 6C is a system component diagram illustrating yet another exemplary system for recording a usage of a service by a user.
Figure 6D:
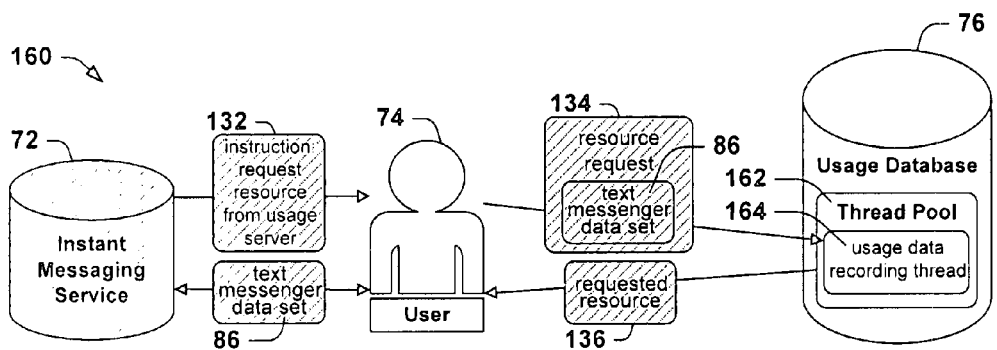
FIG. 6D is a system component diagram illustrating yet another exemplary system for recording a usage of a service by a user.

FIG. 6C illustrates another exemplary embodiment of this technique, which again illustrates a usage of a text messaging service 72 by a user 74 in a text messenger role, and resulting in a text messaging usage data set 86 that is recorded in a usage database 76. In this exemplary implementation 150, and in contrast with the embodiment illustrated in FIG. 6B, the resource request may not be important to the utilization of the service 72, and may in fact be unnecessary to the user 74. The requested resource may even be an empty response returned to satisfy the resource request 134. In the exemplary embodiment 150 illustrated in FIG. 6C, the instant messaging service 72 is configured as a webserver that provides one or more webpages 152 to the user 74 (e.g., webpages that include the instant messages.) The webpage 152 includes an embedded resource request from the usage database 76, and includes the text messenger usage data set 86 in the resource request. More specifically, in this exemplary embodiment 150, the resource request comprises an image embedded in the webpage to be fetched from the usage database 76. The image might be an integral part of the webpage 152, such as a banner image; or it might simply be an imperceptible image, such as a one-pixel-by-one-pixel GIF, embedded in the webpage 152 in order to trigger the image request 154 from the usage database 76. Upon receiving the webpage 152, the user's web browser issues an image request 154 to the usage database 76, where the image request 154 includes the text messenger usage data set 86. Upon receiving the image request 154, the usage database 76 returns the requested image 156 and stores the text messenger usage data set 86. The user's web browser then receives the requested image 156 and includes it in the rendering of the webpage displayed for the user. This exemplary embodiment 150 includes the text messenger usage data set 86 with the image request 154 as a set of HTTP GET parameters, such as in the illustrated HTML document fragment 158 comprising the beginning of the webpage 152. Conversely with the exemplary embodiment of FIG. 6B, these embodiments may reduce the interest of the user 74 in issuing and receiving the image request 154; however, the computational burden on the usage database 76 may be reduced, and the computational resources of the usage database 76 may be more heavily preserved for the usage tracking function.

In embodiments where the instruction is provided in the form of a resource request from the usage database, an aspect of these techniques that may be embodied in various implementations relates to the processing of the resource request by the usage database. When the instruction is issued in the form of a resource request, the user may spend time awaiting a response (e.g., the requested resource) from the usage database. If the response takes a while, the service may appear to be delayed or stalled, and an inordinately long delay in the response by the usage database may cause the service to appear unavailable to the user (e.g., where an image hosted by the usage database and embedded in a web page is not returned in a timely manner, causing the user's browser to time out and incorrectly render the webpage.) Accordingly, the usage database may be advantageously configured to fulfill resource requests quickly, and may even defer the recording of the usage data set.

FIG. 6B presents one exemplary system 160 implementing this technique, which once again illustrates a usage of a text messaging service 72 by a user 74 in a text messenger role, and resulting in a text messaging usage data set 86 that is recorded in a usage database 76. This exemplary system 160 also once again illustrates the instruction as the resource request 134 containing the text messenger usage data set 86 that is issued to the usage database 76, which returns the requested resource 136. In this exemplary implementation 160, the usage database implements a thread pool 162, comprising a set of usage data recording threads 164 configured to handle resource requests 136. Upon receiving a resource request 134, the usage database 76 tasks a usage data recording thread 164 with the resource request 134. The usage data recording thread 164 returns the requested resource 136 to the user 74, and then endeavors to negotiate the recording of the text messenger usage data set 86 in the usage database 76. By distributing the computational burden in this manner, the usage database 76 is configured to fulfill the resource request 134 before recording the usage data set 86, thereby providing a rapid response to the resource request 134 for an improved user experience.

FIG. 6C presents another exemplary system 170 implementing this technique, which once again illustrates a usage of a text messaging service 72 by a user 74 in a text messenger role, and resulting in a text messaging usage data set 86 that is recorded in a usage database 76. This exemplary system 170 also once again illustrates the instruction as the resource request 134 containing the text messenger usage data set 86 that is issued to the usage database 76, which returns the requested resource 136. In this exemplary implementation 160, the usage database implements a usage data set processing queue 172 configured to store the text messenger usage data set 86 for recording after fulfilling the resource request 134. The usage database 76 therefore responds quickly to the resource requests 134 and defers the text message usage data set 86 for subsequent processing (e.g., verification of the text messenger usage data set 86 via included authentication data) and recording in the usage database 76. Again, by distributing the computational burden in this manner, the usage database 76 is configured to fulfill the resource request 134 quickly in order to provide a rapid response to the resource request 134 for an improved user experience.

It may be appreciated that the techniques described hereinabove may be implemented as two forms of systems: a service configured to serve users, to produce usage data sets identifying the user and the role of the user in using the service, and to instruct the user to send the usage data set to the usage database; and a usage database configured to receive and store the usage data set from the user sent upon instruction from the service. Each system may be variously implemented, and an implementation of one such system may be devised that may interoperate with a range of implementations of the other such system.

Figure 7:
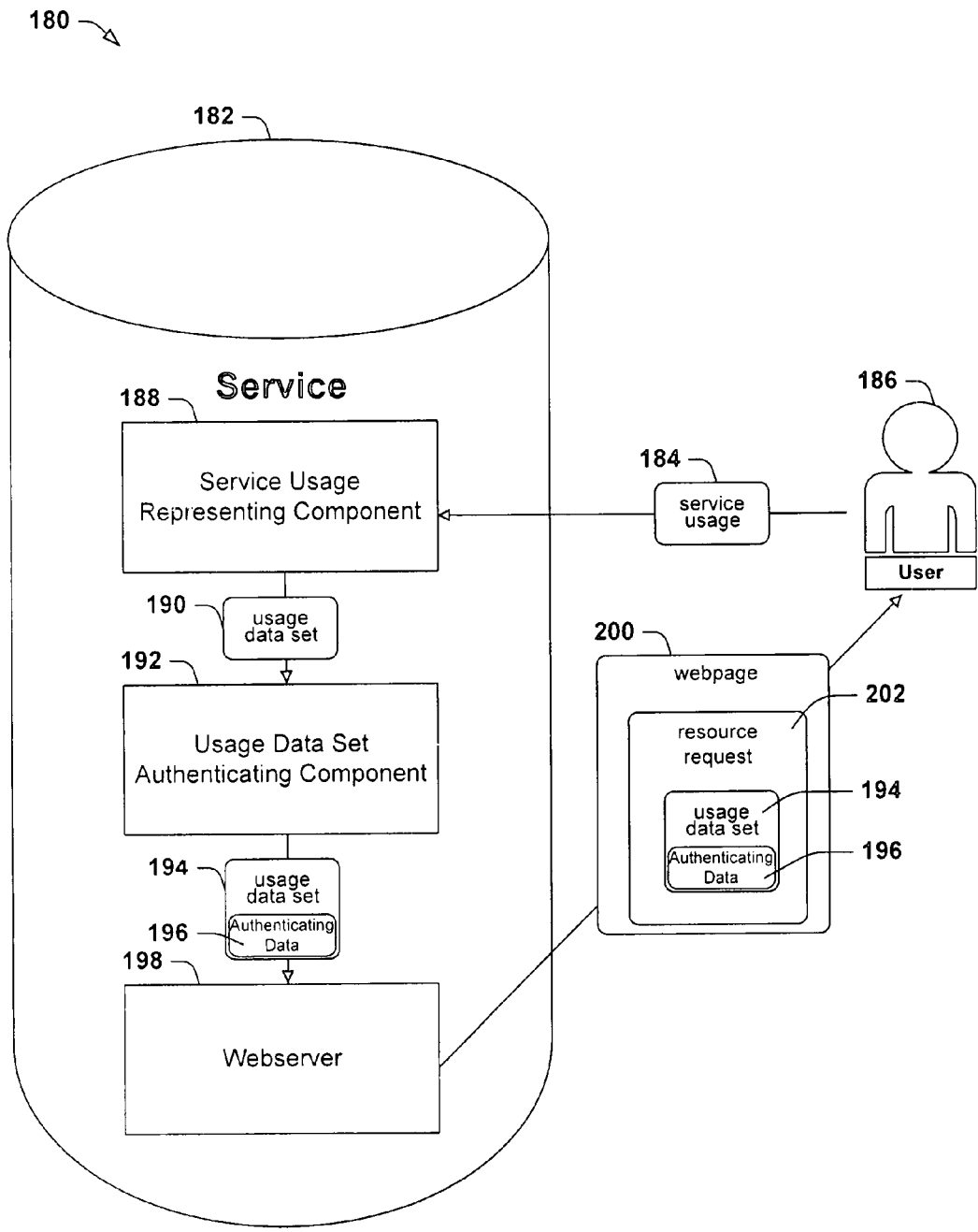
FIG. 7 is a system component diagram illustrating an exemplary system for notifying a usage database of a usage of a service by a user.

A service may be devised for notifying a usage database of a usage of a service by a user. Such a service may be implemented as a service usage representing component configured to generate a usage data set identifying at least the service, the user, and the role of the user; send the usage data set to the user; and instruct the user to send the usage data set to the usage database. FIG. 7 illustrates one such embodiment 180 that exhibits several other advantages of the techniques described herein. The exemplary system 180 of FIG. 7 comprises a service 182 configured to handle a service usage 184 requested by a user 186. The service 182 comprises a service usage representing component 188 configured to generate a usage data set 190 such as described above. Moreover, the service usage representing component 188 may be configured to generate consistent usage data sets for respective usages of the service by a user in a role, such that redundant usage data sets that describe the same usage by the same user may be detected and prevented from further processing at various stages of the system, such as illustrated in FIGS. 4B-4G. The service 182 may further comprise a usage data set authenticating component 192, which may be configured to generate service authentication data 196 that authenticates the creation of the usage data set 190 by the service usage representing component 188, such as described in FIG. 5. The usage data set authenticating component 192 produces a new usage data set 194 including the authenticating data 196, which may be provided to a webserver 198 that is configured to send a webpage 200 to the user 186 that provides the information requested in the service usage 184. The webserver 198 may embed in the webpage 200 a resource request from a usage database that includes the usage data set 194, as well as the authenticating data 196. For example, the webserver 198 may embed in the webpage 200 a request for an image hosted on a usage database, and the image request may include the usage data set 194 and the authenticating data 196, such as illustrated in FIG. 6C. It will be appreciated that this exemplary system 180 is configured to provide the advantages of several service configuration techniques of discussed and illustrated herein.

Figure 8:
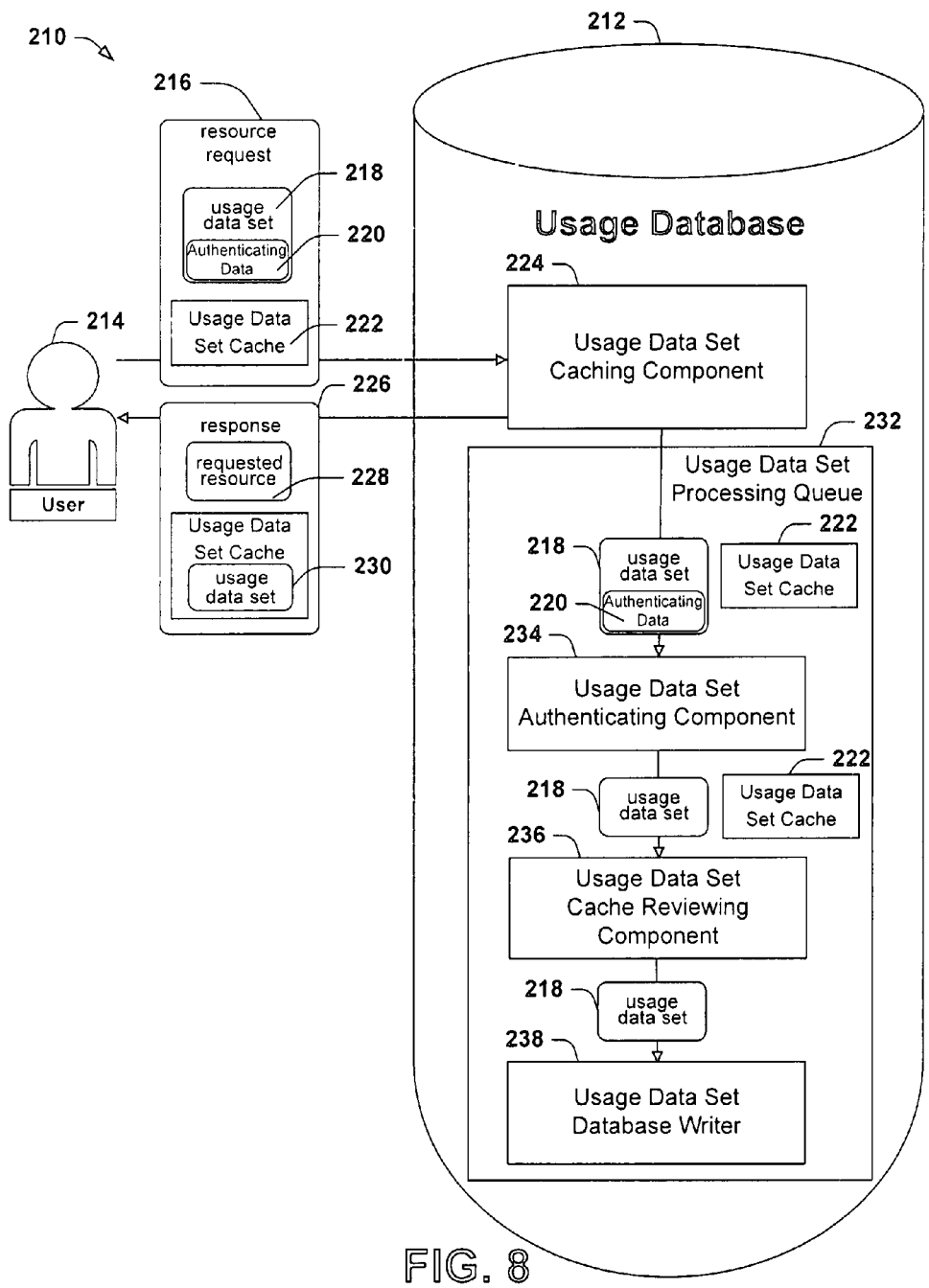
FIG. 8 is a system component diagram illustrating yet another exemplary system for recording a usage database of a usage of a service by a user.

A system may also be devised for recording a usage of a service by a user, in the form of a usage database configured to receive from the user a usage data set identifying at least the service, the user, and the role of the user, and to store the usage data set. FIG. 8 illustrates one such embodiment 210 that exhibits several other advantages of the techniques described herein. The exemplary system 210 of FIG. 8 comprises a usage database 212 configured to receive from a user 214 a usage data set 218 identifying at least the service, the user 214, and the role of the user 214, and to store the usage data set 218. In this exemplary system 210, the usage database 212 is further configured to handle usage data sets 218 encapsulated in resource requests, e.g., as image requests embedded in webpages provided by services, such as illustrated in FIG. 6C. The usage database 212 of this exemplary system 210 is further configured to handle usage data sets 218 comprising authenticating data 220 for verifying the creation of the usage data set 218 by a service, and usage data set caches 222 provided by users 214 along with the usage data sets 218.

Figure 6E:
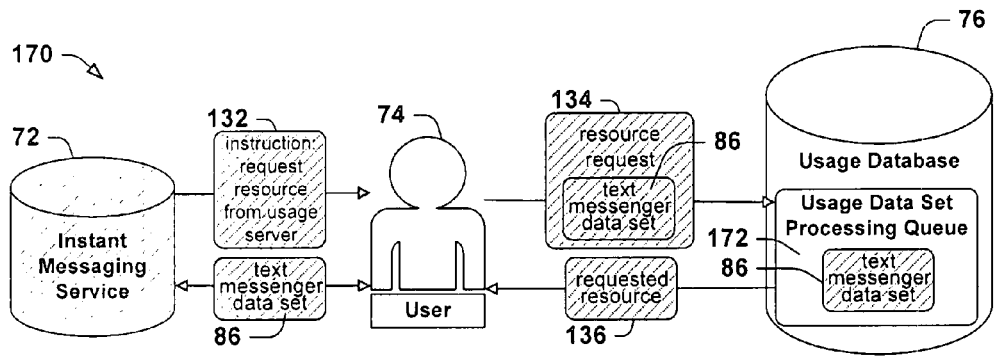
FIG. 6E is a system component diagram illustrating yet another exemplary system for recording a usage of a service by a user.

The resource request 216, including the usage data set 218, the authenticating data 220, and the usage data set cache 222, is received by the usage database 212 and, in this exemplary system 210, is first sent to a usage data set caching component 224, which generates an updated usage data set cache for the user 230 that includes the usage data set 218, such as illustrated in FIG. 4G. The usage database 212 is further configured to fulfill the resource request 216 before recording the usage data set 218, in order to provide a quick response to the user 214 for an improved user experience, such as illustrated in FIG. 6E. The usage database 212 therefore issues a response 226 to the resource request 216, comprising the requested resource 228 and the updated usage data set cache generated by the usage data set caching component 224 and to be stored by the user 214 (e.g., in the user's web browser cookie cache.)

Having fulfilled the resource request 216, the usage database 212 in the exemplary system 210 of FIG. 8 continues to process the usage data set 218. In the usage database 212 of this exemplary system 210, the usage data set 218, authentication data 220, and usage data set cache 222 pass from the usage data set caching component 224 into a usage data set processing queue 232, which is configured to store the usage data set for recording after fulfilling the resource request. This storage permits the usage database 212 to retain the usage data sets 218 and accompanying data and to distribute the processing workload based on computational capacity. For example, during times of heavy service use, the usage database 212 may spend more time collecting and queuing usage data sets 218, and may later process the usage data sets 218 when service demand is lighter and fewer usage data sets 218 are being received. When computing resources become available, the usage database 212 continues processing the usage data set 218, along with the authenticating data 220 and usage data set cache 222.

The usage database 212 in the exemplary system 210 of FIG. 8 further comprises a usage data set authenticating component 234, which is configured to verify with the authentication data 220 the creation of the usage data set 218 by the service before recording the usage data set 218. Accordingly, the usage data set authenticating component 234 receives the usage data set 218, authenticating data 220, and usage data set cache 222 from the usage data set caching component 224 and attempts to verify the authentication of the usage data set 218. If the verification fails, the usage database 212 concludes that the usage data set 218 has been forged or altered, and therefore discards the usage data set 218. However, if the verification succeeds, then processing of the usage data set 218 continues. The usage database 212 of this exemplary system 210 further comprises a usage data set cache reviewing component 236, which is configured to receive the usage data set cache 222 from the user 214 and to prevent recording of usage data sets 218 contained in the usage data set cache 222. Accordingly, the usage data set cache reviewing component 236 checks the contents of the usage data set cache 222 sent from the user 214 to determine if the usage data set is redundant and has already been recorded. If the usage data set cache 222 already contains the usage data set 218, then the usage database 212 concludes that the usage data set 218 is redundant, and discards the usage data set 218. However, if the usage data set cache 222 does not contain the usage data set 218, then the usage database 212 stores the usage data set in the usage database 212. It will be appreciated that this exemplary system 210 is configured to provide the advantages of several usage database configuration techniques discussed and illustrated herein.

Figure 9:
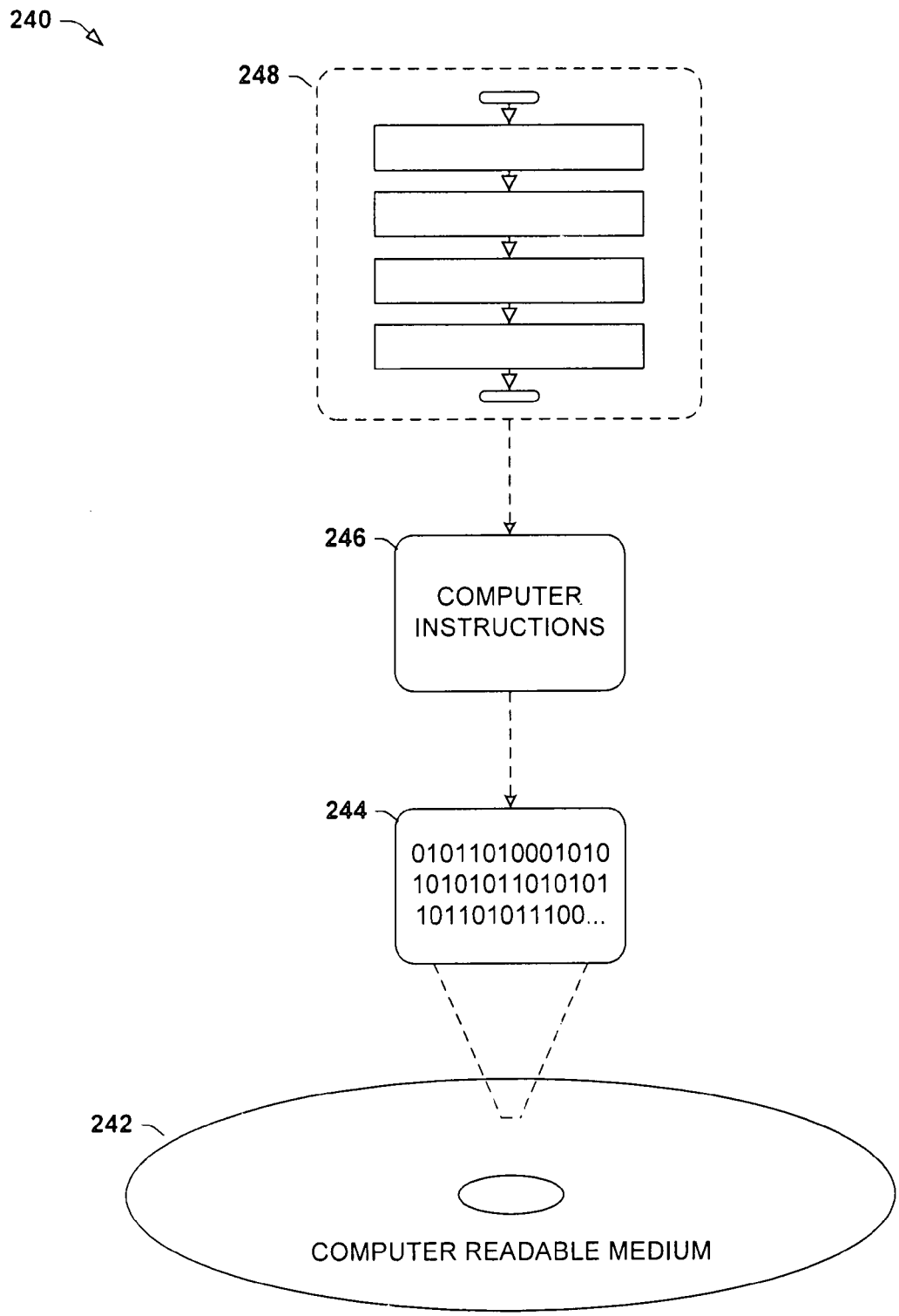
FIG. 9 is an illustration of an exemplary computer-readable medium comprising processor-executable instructions configured to perform a method or implement a system such as disclosed herein.

The techniques discussed herein may also be embodied as a computer-readable medium comprising processor-executable instructions configured to create an aggregated user profile as discussed herein. An exemplary computer-readable medium that may be devised in these ways is illustrated in FIG. 9, wherein the embodiment 240 comprises a computer-readable medium 242 (e.g., a CD-R, DVD-R, or a platter of a hard disk drive), on which is encoded computer-readable data 244. This computer-readable data 244 in turn comprises a set of computer instructions 246 configured to operate according to the principles set forth herein. In one such embodiment, the processor-executable instructions 346 may be configured to perform a method of recording a usage of a service by a user, such as the exemplary method illustrated in FIG. 2. In another such embodiment, the processor-executable instructions 346 may be configured to implement a system for notifying a usage database of a usage of a service by a user, such as the exemplary service illustrated in FIG. 7, or a system for recording a usage of a service by a user, such as the exemplary usage database illustrated in FIG. 8. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of recording a usage of a service by a user, the method comprising:
   generating a usage data set identifying at least the service, the user, and the role of the user while interacting with the service;
   sending the usage data set to the user;
   instructing the user to send the usage data set to a usage database; and
   upon the usage database receiving the usage data set from the user, storing the usage data set in the usage database.

2. The method of claim 1, the service configured to generate consistent usage data sets for respective usages of the service by a user in a role while interacting with the service.

3. The method of claim 2, the user configured to store in a usage data set cache the usage data sets sent to the usage database.

4. The method of claim 3, the user configured to prevent sending to the usage database a usage data set contained in the usage data set cache.

5. The method of claim 3:
   the user configured to send the usage data set cache to the usage database, and
   the usage database configured to prevent recording of usage data sets contained in the usage data set cache.

6. The method of claim 1, the usage data set comprising service authentication data that authenticates the creation of the usage data set by the service.

7. The method of claim 1:
   the instructing comprising instructing the user to request a resource from the usage database, and
   the resource request containing the usage data set.

8. The method of claim 7:
   the service comprising a webserver configured to send a webpage to the user, and
   the resource request comprising a resource request from the usage database embedded in the webpage that includes the usage data set.

9. A system for notifying a usage database of a usage of a service by a user, the system comprising:
   a processor; and
   a memory storing instructions that, when executed on the processor, implement a service usage representing component configured to:
   generate a usage data set identifying at least the service, the user, and the role of the user while using the service;
   send the usage data set to the user; and
   instruct the user to send the usage data set to the usage database.

10. The system of claim 9, the service usage representing component configured to generate consistent usage data sets for respective usages of the service by a user in a role while using the service.

11. The system of claim 9, comprising a usage data set authentication component configured to generate service authentication data that authenticates the creation of the usage data set by the service usage representing component.

12. The system of claim 9, the instruction comprising an instruction to request a resource from the usage database, and the resource request containing the usage data set.

13. The system of claim 12, the service comprising a webserver configured to send a webpage to the user, and the resource request comprising a resource request from the usage database embedded in the webpage that includes the usage data set.

14. A system for recording a usage of a service by a user, the system comprising:
   a processor; and
   a memory storing instructions that, when executed on the processor, implement a usage database configured to:
   receive from the user a usage data set generated by the service and identifying at least the service, the user, and the role of the user while using the service, and
   upon receiving the usage data set from the user, store the usage data set in the memory.

15. The system of claim 14:
   the usage data set comprising a usage data set cache, and
   the system comprising a usage data set cache reviewing component configured to receive the usage data set cache from the user and to prevent recording of usage data sets contained in the usage data set cache.

16. The system of claim 14, comprising: a usage data set caching component configured to send a usage data set cache to the user to be stored.

17. The system of claim 14:
   the usage data set comprising service authentication data that authenticates the creation of the usage data set by the service; and
   the system comprising: a service verifying component configured to verify with the service authentication data the creation of the usage data set by the service before recording the usage data set.

18. The system of claim 14, the usage data set sent to the usage database in a resource request, and the usage database configured to fulfill the resource request before recording the usage data set.

19. The system of claim 18, the usage database comprising: a usage data set processing queue configured to store the usage data set for recording after fulfilling the resource request.

* * * * *